Nov. 19, 1929.  L. T. ROBINSON  1,736,625
BROODER
Filed March 24, 1927  2 Sheets-Sheet 1
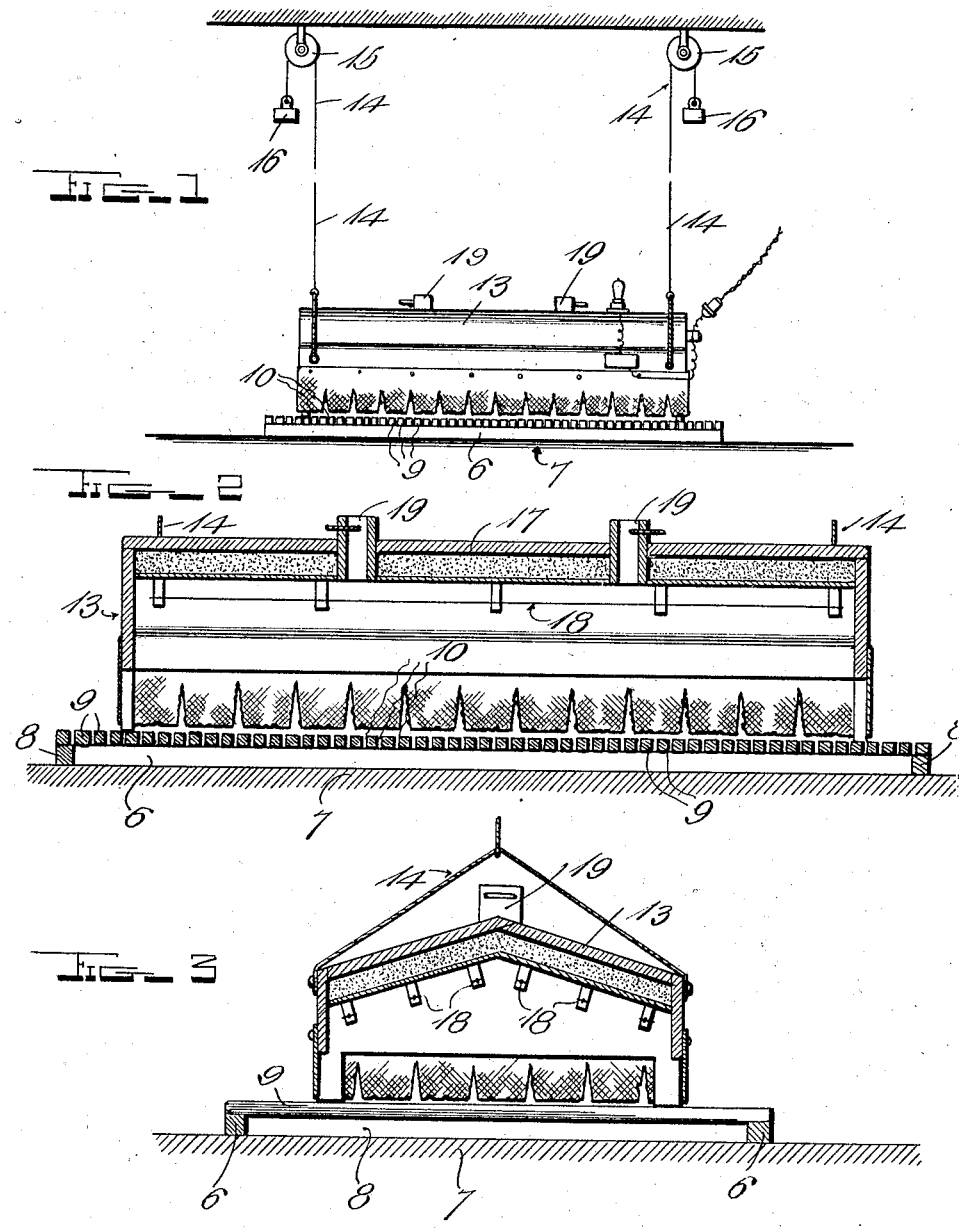

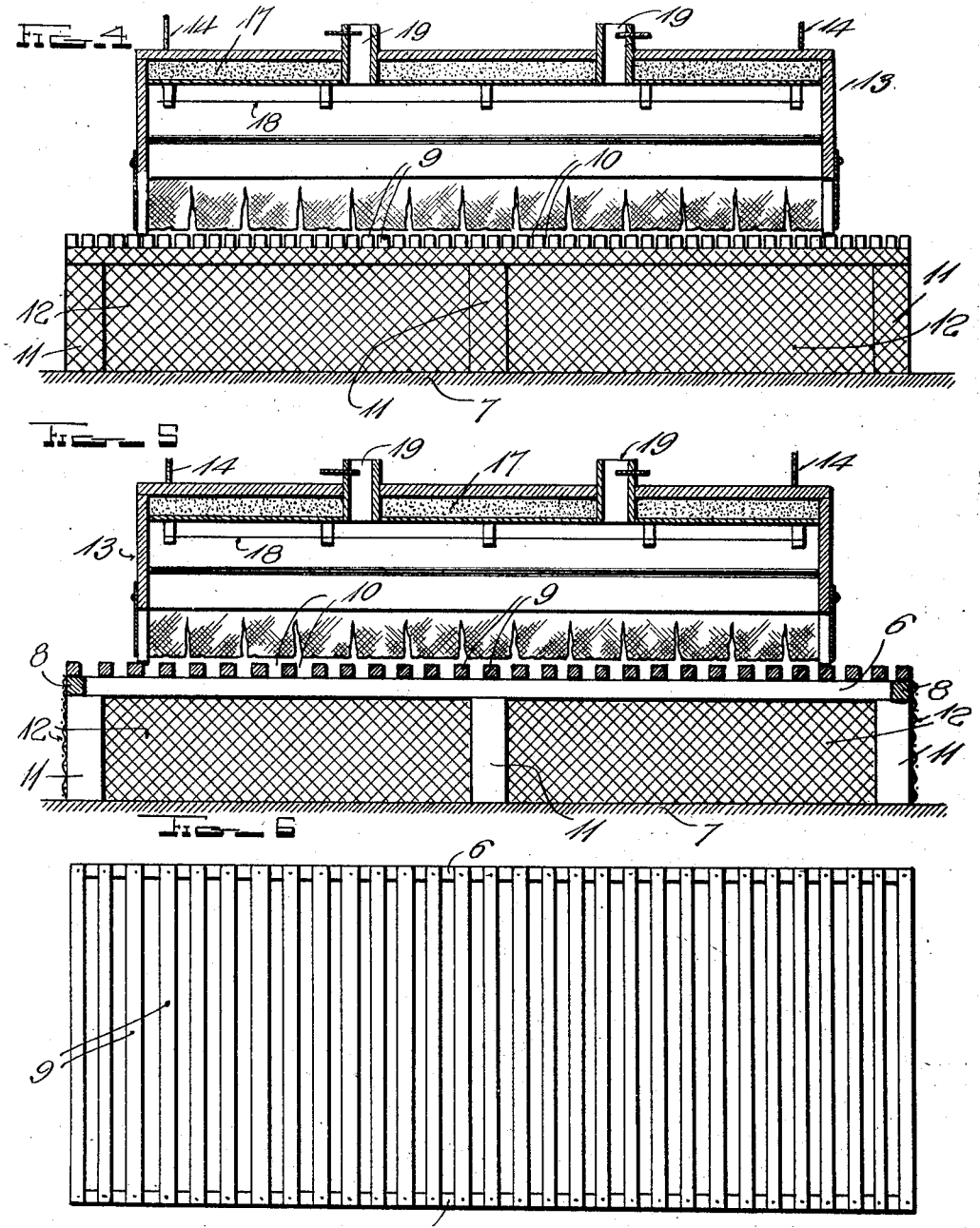

Patented Nov. 19, 1929

1,736,625

UNITED STATES PATENT OFFICE

LEWIS T. ROBINSON, OF SILVERTON, OREGON

BROODER

Application filed March 24, 1927. Serial No. 178,107.

The invention relates to brooders and has more particular reference to one embodying a slatted floor unit which will teach the chicks to roost from the start. The floor slats are at first closely spaced and close to the brooder house floor for young chicks, but when the chicks grow sufficiently, some of the slats are removed, leaving only perch-forming slats. At that time or later, legs are inserted under the floor unit to elevate it and accustom the chicks to elevated roosting. Used with the floor unit is a brooder unit to protect the chicks against cold, and it is the principal object of my invention to provide a construction in which the brooder unit rests directly upon the floor unit whether the latter be in raised or lowered position, and in which said brooder unit is bodily removable from said floor unit when desired. By having the brooder unit bodily removable from the floor unit, unobstructed access may be had to the latter whenever it is necessary to remove or insert slats and whenever the floor unit is to be cleaned. Moreover, by again resting the brooder unit on the floor unit when the latter is supported at an elevated position, the head room for the chicks is not decreased as would necessarily follow if the floor unit were raised within the brooder unit.

A further object of the invention is to provide a brooder of the character set forth which embodies means for supporting the brooder unit when the latter is raised bodily from the floor unit.

With the foregoing in view, the invention resides in the novel subject matter hereinafter described and claimed, the description being supplemented by the accompanying drawings.

Figure 1 is a side elevation of the improved brooder.

Figure 2 is a longitudinal sectional view.

Figure 3 is a vertical transverse section.

Fig. 4 is a view similar to Fig. 2, the floor being elevated.

Figure 5 is a view similar to Fig. 4, the floor being arranged differently.

Figure 6 is a top plan view of the floor in the condition shown in Fig. 5.

The numerals 6 in the drawings above briefly described, designate two parallel sills adapted to rest upon a brooder house floor or other horizontal support 7, the ends of said sills being preferably connected by transverse bars 8. Supported by these sills 6, and forming therewith a floor unit, are a number of parallel slats 9 which are closely related to each other, but are spaced apart slightly as indicated at 10, to permit droppings to fall between them and to allow effective ventilation. The sills space the slats 9 upwardly from the supporting surface 7, so that there is little danger of the chicks becoming injured by any poisonous gases or dampness which settles to the lowest level, it being observed that the spaces 10 permit gases or moisture from the interior of the brooder to settle into the space below the slats 9. These spaces 10 are also of advantage, in that they permit the young chicks to grasp the slats 9 with their feet, teaching them to roost, from the start.

At a suitable time, preferably when the chicks are about five weeks old, I elevate the entire floor unit as shown in Figs. 4 and 5. This may be done in any desired manner, but to support said floor unit, legs 11 or equivalent means are inserted under the sills 6 and may be supported in fixed relation therewith, in any desired manner. Wire netting 12 is preferably fastened around the space under the elevated floor unit, to prevent the chicks from walking upon the droppings which fall through the spaces 10.

Elevating the floor unit, as above set forth, teaches the young chicks to jump or fly upwardly, and when they have developed sufficiently to make such a change advisable, certain of the slats 9 are entirely removed, so that the remaining slats constitute spaced, independent perches, upon which the chicks must roost. Thus, they become accustomed to roosting, that when they are weaned from the brooder, no trouble is experienced in having them fly to roost upon the perches of a hen house.

In connection with the improved floor unit, a brooder unit 13 is employed. This brooder unit rests on the floor unit whether the latter be in lowered or in raised position, and it may be bodily removed from said floor unit when desired. By removing the brooder unit 13 bodily from the floor unit, unobstructed access may be had to the latter whenever it is necessary to remove or insert slats and whenever the floor unit should be cleaned. Moreover, by again resting the brooder unit on the floor unit when the latter is supported at an elevated position, the head room for the chicks is not diminished as would necessarily happen if the floor unit were raised within the brooder unit.

To support the brooder unit 13 whenever it is raised clear of the floor unit, I connect cables or other flexible lines 14 with the brooder unit, passing these cables over sheaves 15 mounted above the brooder, and provide said cables with counterbalancing weights 16.

The brooder unit 13 is preferably provided with a heat-retaining top 17, with electrical heating means 18, and with suitable ventilators 19.

I claim:

1. In a brooder construction, a floor unit comprising sills and a multiplicity of closely spaced slats on said sills jointly forming a floor for young chicks, a plurality of said slats being removable to leave only perch-forming slats when the chicks have grown sufficiently to roost; legs insertible under said sills to support the perch-forming slats at elevated positions when the chicks have advanced sufficiently to train them for elevated roosting, and a brooder unit resting on and supported by said floor unit when the latter is either in a raised or lowered position, said brooder unit constituting the sole enclosure for the chicks and being bodily removable from said floor unit to give unobstructed access to the latter for removing or inserting slats and for cleaning.

2. In a brooder construction, a floor unit comprising sills and a multiplicity of closely spaced slats on the sills jointly forming a floor for young chicks, a plurality of said slats being removable to leave only perch-forming slats when the chicks have grown sufficiently to roost; legs insertible under said sills to support the perch-forming slats at elevated position when the chicks have advanced sufficiently to train them for elevated roosting, a brooder unit resting on and supported by said floor unit when the latter is either in a raised or lowered position, said brooder unit constituting the sole enclosure for the chicks and being movable bodily upward from said floor unit to give unobstructed access to the latter for removing or inserting slats and for cleaning, sheaves mounted above said brooder unit, flexible lines trained over said sheaves and connected to said brooder unit, and counterbalancing weights on said lines cooperating therewith in supporting the brooder unit above the floor unit when raised clear thereof.

In testimony whereof I have hereunto affixed my signature.

LEWIS T. ROBINSON.